Patented Feb. 10, 1942

2,272,989

UNITED STATES PATENT OFFICE 2,272,989

FOOD PRODUCT AND METHOD

Jesse Clayton Forkner and John H. Forkner, Fresno, Calif.

No Drawing. Application November 29, 1940, Serial No. 367,764

17 Claims. (Cl. 99—125)

Our invention relates to the provision of an improved fruit product for use in bakery goods. It is concerned more particularly with the provision of a fruit paste, filler, or pellet made from a selected edible fruit and a carrying vehicle prepared from the fibrous meat of nuts such as coconuts, brazil nuts, babassu nuts, and palm kernels, which acts as a stabilizer and provides improved results not heretofore available.

An object of our invention is to provide a fruit paste which can be mechanically formed into pellets, and having a capacity for further moisture absorption.

Another object is to provide a fruit paste or fruit and sugar paste of the character referred to which may expand upon heating and which will solidify or set in its expanded condition without subsequent contraction.

Another object of our invention is to provide a stabilizer for fruit paste which has a materially greater volume and moisture absorption capacity than the fruit ingredient.

Another object of our invention is to provide a white fibrous stabilizer for fruit paste which may provide a base for bright colors, such as yellow and green, and aid in lightening or preserving natural fruit colors.

Another object of our invention is to provide a fruit pellet which has a uniform and homogeneous expansion and is not subject to cracking when baked or thereafter.

Another object of our invention is to provide a fruit pellet of a non-viscous nature which has improved characteristics in preventing sticking to cutting knives, in lessening the tendency to pull the pellet out of the dough in cutting, in preventing streaking of the pellet color across the dough, and in preventing breaking down of the pellet after cutting.

Another object is to provide a fruit paste of the character referred to which will not rapidly lose appreciable moisture to the surrounding dough either during or after baking.

Another object of our invention is to provide a fruit paste product of the character referred to which is adapted for use in bakery goods such as fruit cake and which will retain the same approximate density as the surrounding baked dough.

Another object of our invention is to provide a fruit stabilizer or carrier which blends into the fruit agent mixed therewith so as to lose its identity and acquire and assimilate the principal characteristics of the fruit agent in appearance, taste, odor, and color.

Another object of our invention is to provide a chocolate fruit paste, filler or cube, when used in a baked goods product, having the cellular structural framework of coconut fiber, but the flavor of chocolate.

Another object of our invention is to provide a baked dough product having a filler uniformly dispersed therein which is capable of carrying and imparting special flavors or colors to the product, or to allow an increased moisture content thereof.

Other objects and advantages of the invention will be apparent from the following description of a preferred form of the product and a preferred method of producing such product.

Known common commercial stabilizers fall generally into three groups. We believe none of these provides a suitable carrying vehicle for fruit or fruit and sugar in pellet-like form for use in bakery goods. Pectin and gum arabic types of stabilizers will provide a very heavy base apparently suitable, but which must be brought to a boil before they will absorb additional amounts of water. Used in bakery products as herein described, the fruit is rarely if ever brought to a boiling point, so that this type of stabilizer during baking does not achieve sufficient water holding and retention capacities. Actually these stabilizers will lose considerable moisture in baking and will break down and cause a soggy, doughy mass of dough surrounding them.

Other stabilizers, for instance agar and gelatin, do not require boiling for moisture-carrying properties, but these forms of stabilizers do not provide a heavy fibrous base of the same consistency as heavy jams and ground dried fruit paste. Both pectin and agar groups are jelly-like or gummy in consistency and do not provide a sufficiently heavy body nor a suitable consistency in conjunction with fruit when baked, and they also have the disadvantages last-named in the preceding paragraph.

A third filler and stabilizer is the cereal group which is best exemplified by flour or starch, and in all cases this group is not suitable for use in necessary amounts in conjunction with fruit because, in contrast to fruits, they bake under heat. Also, they impart a foreign taste to the product.

Our invention comprises a new stabilizer which eliminates all of the above-described difficulties heretofore common with their use with fruits for this purpose. Particularly, it does not bake under high degrees of heat; it does not require boiling to provide it with its moisture absorption capacity; it does not break down or contract either during or after baking. It will absorb any free moisture surrounding the cube in the baked dough mass usually caused by the evaporation of steam. It is not sticky, viscous, nor glutinous, and it is insoluble.

Our invention contemplates the use of the fibrous meat of nuts, and particularly coconut, when prepared and treated as herein described and which is available in various raw forms, for example as a meal which is widely used for stock feed. Attempts have been made to use this meal as a food product for human consumption, but no widespread use of the meal has resulted from such attempts.

In accordance with the instant invention, a meal or fiber such as that of coconut is prepared for use as a stabilizer or stabilizer and solidifier and as a carrying agent for a desired edible fruit product of the character commonly employed in the bakery trade. In this use advantage is taken of the desirable individual cellular structure and insoluble character of the fiber, as well as its recognized food values.

In describing the invention, reference will be had to a coconut product which is the preferred ingredient, but it is to be understood that the invention is also useful with other similar nuts. In preparing the stabilizer for use with the fruit, the source of material may be various forms of coconut meat such as copra meat, desiccated coconut meat, or fresh coconut meat, which may be processed either by drying or in an expeller or in a press. We prefer to use material which has been processed in a press because this method does not readily lessen or break down the individual cellular structure of the meat; it does not burn or darken the product and it eliminates risk of spoiling. It is also preferred to employ desiccated coconut meat because of its white color. We may use copra meal treated as hereinafter described, but care would be necessary in cleaner drying of the copra to preferably remove or finely grind shell particles and other foreign matter. We may lighten the color by washing and perhaps boiling and otherwise treating with peroxide, sulphur, and other common bleaching agents. Sun dried copra is preferable.

Fresh coconut may be used but is not as desirable as desiccated meat because the pressing in its natural state does not provide a substance of the most desirable cellular structure.

In preparing the stabilizer, the comminuted coconut meat is placed in a suitable agitator or mixer together with an amount of water sufficient to dissolve out the undesired constituents of the meat. The mixture is agitated for a period to effect the desired dissolving action, after which the water is removed and a re-washing step may be effected if desirable, after which the macerated mixture is treated to remove the liquid constituents. For example, the mixture may be placed in mats in a suitable hydraulic press to express the liquid from the solid fibrous constituents of the meal. In this way, substantially all of the essential oil, flavoring constituents, and other water-soluble constituents are removed, leaving a dry fibrous mass suitable for the carrying vehicle as herein disclosed. If expeller meal is used, it will be washed as above described and the moisture removed by pressing or drying.

For example, we may take 100 lbs. of desiccated coconut of a fine consistency and place it with 900 lbs. of boiling water in a suitable agitator where washing, draining, and re-washing with agitation is carried out for about one hour. Subsequently, the entire drained mass is placed in a suitable hydraulic press to press out the major portion of the liquid constituents. The press being stopped at say 5,000 lbs. pressure per sq. in. and left for about 1 hour to allow final drainage.

If desired, the washing step may be accompanied by the addition of a suitable alkali of an appropriate amount, say about 6 oz. of lye in the above example, to saponify the soap-forming ingredients of the residual oil in the coconut fibers. Where an alkali is employed, after the washing step with the lye and water mixture, the liquid is drained from the agitator and a second washing or rinsing step is essential to insure removal of all soapy flavor.

The saponification by the addition of lye serves to eliminate from the stabilizer any oil constituents which might tend to react with alkaline matter encountered in further use of the fiber and cause an undesirable soapy flavor. The press cake from the above operations may be dried in any convenient manner, and may be ground to further fineness.

Another method of preparing tropical nut fiber is here exemplified using coconuts. We first comminute the fresh coconut meat, which is preferably pared. We then wash in a large container, with or without the addition of a saponifying agent to the water, drain the water, and rewash. Particularly if hot water is used, two or more washing operations will essentially remove the larger portion of the natural oil and flavor. The resulting substance may be then dried by common sun drying or other desiccating methods, as for instance, dry steam or circulating hot air.

The fibrous material or stabilizer resulting from the above treatments is essentially free of the natural oils and flavors of coconut and is capable of absorbing several times its weight of moisture. Particularly, such fibrous material will absorb an equal weight of moisture while retaining the dry appearance and characteristics commonly associated with desiccated coconut. Further, when finely comminuted, this coconut fiber has the property of assimilating itself with a fruit agent, such as a dried fruit or a fruit jam, so as to be indistinguishable as coconut in the resulting fruit paste. The coconut fiber tends to lose its identity and to acquire the characteristics of appearance, taste, odor, and color of the fruit with which it is mixed. At the same time, the fiber imparts to the mixture its characteristic cellular structure and its characteristic reactions to heat and moisture.

In making the paste it is preferred to use not over 25 to 30% by weight of the coconut stabilizer, depending upon the character of fruit product with which it is employed. In any event, the amount used should not be sufficient to cause the resultant fruit paste to lose the characteristic flavor of the fruit with which it is mixed. Also, the amount employed should not be so small as to undesirably lessen its moisture absorbing capacity. We have found that about 8 to 12% by weight of the stabilizer is the most suitable proportion for pellets and a larger proportion for other uses is sometimes desirable.

As stated above, the edible fruit products employed may be dried fruit such as prunes, raisins, apricots, peaches and figs, which should be sterilized by any commonly recognized process. Also, the fruit products may include jams and marmalades of the usual type, wherein the fruit is preserved with sugar by cooking and concentrating to the desired consistency. Any type of edible fruit may be employed for the jams and marmalades including berries. Chocolates and other similar ingredients can be employed.

For example, the following formula may be employed for the manufacture of a dried fruit paste suitable to mechanically make cubes or pellets for use in fruit cake or bread.

| | Pounds |
|---|---|
| Coconut stabilizer | 70 |
| Finely ground dried figs | 250 |
| Orange jam | 75 |
| Powdered sugar | 175 |
| Orange flavor, color and salt to suit. | |

The dried figs in the above example are used as a binder, and other suitable binders may be used, such as other fruits, cereals or sugars. In preparing the above paste, the ingredients are all mixed together and preferably milled in roller refiner to further disperse and finely grind the coconut particles and to provide a uniform mass and an intimate intermixture of the various ingredients. The paste is then introduced into a common pellet-forming machine such as a fig pellet machine or a cut and roll confectioner's unit. In this latter equipment the fruit is pressed by a sausage or roller type press through nozzles, cut by wire, and preferably rolled by top and bottom counter agitating belts, usually using flour or starch drying powder.

We prefer to mechanically roll our pellets by a common fig pellet machine, common to the dried fruit industry, consisting of a top roller press, forcing the fruit into a meat grinder chamber which in turn continuously forces the mass through suitable size openings in an outer die where they are appropriately cut by revolving cutting knives attached to the worm shaft, or otherwise tightly fitting the die. Simultaneously, a suitable flour, preferably rice flour, is blown on the face of the die thoroughly surrounding the fruit as it protrudes, and is thereafter shaken off or removed by common shaker methods.

The stabilizer of the instant invention, because of its individual dry cellular, non-viscous consistency, provides this fruit base with the essential characteristics necessary for this process of production. It keeps the fruit firm while it is traveling through the grinder chamber and does not allow it to break down excessively under the heat therein generated as occurs with many natural fruits. Further, the fruit and fiber paste does not gum up on the outer face of the die and the cutting knives while in the process of being cut. As it is not as sticky, the small particles do not tend to stick together, and the firm body provides a suitable cutting base and it thereafter retains its shape. The lack of free moisture does not wet the flour or starch which is blown on the fruit as it protrudes from the die. The fiber keeps the pellets firm so that they do not stick together during or after cutting or later when ultimately packed. This is in contrast to certain natural fruits and jams (particularly if fortified with sugar) which break down excessively due to the heat in the grinder chamber. Many fruits are naturally so soft that they present free moisture and tend to liquefy when they protrude from the cutting die so that the knives produce a gummy mass preventing suitable pellet production with the described type of equipment.

A further example for preparing an apricot paste is

| | Pounds |
|---|---|
| Dried ground apricots | 200 |
| Coconut stabilizer | 20 |
| Total | 220 |

The apricots and stabilizer are mixed and milled in a suitable roller refiner to the desired uniformity.

For use with fruit for mechanically made pellets such as dried prunes, the following formula may be followed:

| | Pounds |
|---|---|
| Dried prunes | 200 |
| Coconut stabilizer | 20 |
| Granular sugar | 50 |

In preparing pastes such as those given above, the coconut stabilizer and the fruit may be milled or ground together or separately and the size of the coconut stabilizer particles may be controlled by the type of grinding operation in accordance with the desired characteristics of the resulting product.

Paste made in accordance with the above suggestion may be employed in or between layers of dough as in filled cookies, and as fillings and toppings for cakes and pastries. By controlling the sugars, color and flavor added, combinations of fruit paste having our fibrous carrier may be made to resemble any selected fruit product, such as cherry or orange products.

In filled cookies, such as fig bars, it is desirable in many instances to incorporate as much sugar and syrup and moisture in proportion to the fruit as is possible. In this instance the fruit acts as a carrying vehicle for the other ingredients.

Heretofore, the amount of water and sugar that could be added to the fruit vehicle has been limited by the following factors:

(a) If too much water was added it soaked into and spoiled the dough during and after baking and tended to break down while the product was being cut. Cookies stuck together when packed and ran at the ends.

(b) If the carrying vehicle was an extremely hygroscopic fruit, such as raisins, the filler tended to absorb an excessive quantity of moisture from the atmosphere in areas of high humidity. This moisture was absorbed from the filler by the dough, causing spoiling. This difficulty has made raisins and many other fruits generally undesirable for this type of bakery product.

(c) If too much sugar or syrup was added to the fruit filler it caused the filler to liquefy and to expand during baking and while hot. After baking the dough cools relatively quickly and sets hard. The filler cools much more slowly and when cold the fruit and sugar tend to contract from its dough jacket, leaving observable air pockets which later cause cracking and breaking in the dough jacket.

For the above reasons, heretofore it has not been commercially possible to manufacture filled fruit cookies exceeding about an equal part of sugar to a part of fruit and the total of the water content approximating 25%. By our process of incorporating in the filler about 15% tropical nut fiber, prepared as herein indicated, we may increase both the moisture and sugar content without the above enumerated difficulties, because the comminuted fiber carries the water in finely diversified particles and prevents excessive accumulation in small areas causing spoilage.

We find we can add in addition to its normal moisture content of the fruit paste at least a weight of water equal to that of the fiber and where the sugar content is high enough to prevent spoilage.

Further, the fiber tends to set the filler at its highest point of expansion during baking. Thereafter the lack of contraction minimizes air pockets and further jacket cracking difficulties, providing a filling of high sugar and/or moisture content that fills snugly its dough jacket. Also, the fiber tends to hold the moisture in the filling and to prevent rapid absorption by the dough. This remedy is effective either where excessive moisture is implanted during mixing or if the fruit absorbs moisture from the atmosphere at a later date.

We sometimes desire the fiber to absorb an appreciable part of its agent, comprising a colloidal liquid. In this process we preferably place the fiber and the agent to be absorbed in a vacuum tank containing an agitator. By heating the tank to a point that will not burn the fiber, say 140°, we can keep the liquids in solutions to allow absorption by the fiber.

In some instances it is desirable to retain moisture in the fiber over an extended period of time, for example, in storing or packaging our fiber for sale after treatment thereof to provide the desired moisture content. For such purposes, the individual fiber particles may be provided with a moisture retaining coating after the desired moisture absorption treatment, for example, with a colloidal liquid. Paraffin, gums or sugars may be employed for this purpose. In carrying out this treatment, the fiber is first subjected to its liquid agent, and is then placed in a suitable heated agitator with the selected coating agent in liquid form. Preferably, the treatment is carried out under vacuum where the coating agent will be maintained liquid at a low temperature which will not burn the fiber. In this way the coating agent can be uniformly applied to cover the fiber particles and thus retard loss of moisture.

A further attribute of our fiber prepared as herein specified is that it can be made in a very white form. Recognizing that its volume per unit weight is two or more times that of dried fruit, a relatively small percent of fiber will yield a high apparent volume. Because of the aforesaid mentioned combined whiteness and volume, this carrying vehicle imparts a whitening action to its accompanying agent, particularly when used in conjunction with the buff brown of white figs, or the darkness of black figs or prunes. Of course, a similar action occurs with other dried fruit. Further, for the same reasons as above indicated, the fiber provides a superior carrier for a light color such as green or yellow.

From the above description, it will be recognized that we have provided a manufactured fruit product which provides a number of new and advantageous characteristics not inherent in natural fruits. The stabilizer has a much greater volume for a given weight than natural fruit, so that a small per cent of the carrier by weight provides a large volume for carrying capacity. The stabilizer has a moisture-absorbing capacity of at least its own weight while sustaining the essential characteristics of dryness. The stabilizer's moisture absorbing capacity is present at all normal and baking temperatures and will expand by the absorption of escaping steam and moisture from the surrounding dough in cooking and will not contract upon cooling. In this way it can be used in dough products without causing air pockets in the surrounding dough. The expansion of this fruit product is uniform, eliminating cracking. Further, the density of the mixture of the fruit and the stabilizer is substantially similar to that of the surrounding baked dough. The coconut fiber inhibits and lessens the naturally viscous nature of many dried fruits and fruit jams. For example, the bakery item can be sliced evenly and without streaking and sticking to the knife because of the fruit pellets therein. It has been found also that the stabilizer and fruit mixture upon cooling will retain the absorbed moisture so that uniform and proper baking of the dough immediately around the pellets is insured. The mixture of the fruit and stabilizer may be such that the presence of the coconut is not obviously detectable by inspection, so that bakery items containing the product present the appearance of the selected fruit to the consumer. We may use the fiber of the several nuts above enumerated or combine them, in which case we would process them in the hereinafter described manner.

Our nut fibers provide a cellular-like fibrous frame acting as the carrying vehicle for other ingredients in bakery products. The resulting bakery product has the fibrous cellular structural frame work supporting the dough ingredients and the essential flavor and color of its fruit agent. For instance, the formula

| | | |
|---|---|---|
| Coconut fiber | pounds | 1½ |
| Sugar | do | 3 |
| Liquor chocolate | do | ½ |
| Shortening | do | ½ |
| Egg whites | do | 1½ |
| Flour | ounces | 8 |

Chocolate flavor, color and salt to suit.

The sugar may be substituted, or partially substituted, with other fruits, as, for instance, orange or raspberry jam; omitting, of course, the chocolate in this formula. The objective in this formula is to produce a fruit or chocolate flavored and colored baked cookie or muffin with a coconut like structural consistency.

In many bakery products, as fruit cake, it is desirable to mix in a large amount of water that will become a part of the final baked product evidencing no free moisture and not providing the moisture an opportunity to draw together causing soggy masses of dough. This may be very conveniently done by first mixing, for instance, an equal amount of water with finely comminuted particles of tropical nut fiber prepared as herein indicated. After soaking the mass for several hours it then may be implanted into the dough in conjunction with other fruits. The fiber will become equally mixed through the mass, will not draw together or readily release its moisture during baking and thereafter. It will remain in a well diffused manner, and as the moisture is gradually released it will seep into the dough in such gradual and small amounts that it will only tend to keep the dough fresher for a longer period of time.

The expressions "intimate mixture" and "intimately mixed" as used in the following claims are intended to mean that the stabilizer component is substantially uniformly dispersed in the fruit component of the mixture so that the said components give the appearance of a homogeneity.

It will be recognized that the moisture absorption and retention capacity of our fiber is substantially greater than that of nut meats essentially containing their oil such as desiccated coconut. Our fiber permits actual permeation of the water into its cells in the intimate manner previously enjoyed by the oil. Such a permeation obviously cannot occur where the natural oil is still essentially present in the meat. Thus, our fiber will retain its equal weight of moisture for a much longer period than desiccated coconut will retain its equal weight of moisture.

Water will become equally and finely divided throughout the baked goods in this process and each granular cell will become naturally coated with the constituents of the dough. This allows for a high water content without the common danger of spoilage. In summary, it will become apparent that relatively excessive amounts of water may be implanted in bakery products with no danger of fermentation.

The nut fiber treated as herein specified utilizes most completely its properties as a carrying vehicle or stabilizer in conjunction with bakery products; yet its use in other food products as a carrying vehicle, filler, stabilizer, or color carrier is herein conceived and with particular reference to the merits of this stabilizer and for this use in ice creams and candies.

We claim:

1. A food product consisting of a fibrous coconut meat carrier with its natural oil and flavoring constituents essentially removed, said carrier being intimately mixed as a filler and stabilizer with a dried fruit, said product having the characteristic properties of the fruit as to taste, odor, and appearance.

2. A fruit product comprising an intimate mixture of a fruit and a minor proportion of a stabilizer comprising fibrous coconut meat having at least a portion of its oil removed.

3. A fruit product comprising an intimate mixture of dried fruit particles and a minor proportion of a stabilizer comprising fibrous coconut meat, having at least a portion of its oil removed.

4. A fruit product comprising an intimate mixture of a dried fruit and a minor proportion of a stabilizer comprising fibrous coconut meat having at least a portion of its oil removed and capable of absorbing additional moisture.

5. A bakery product fruit ingredient comprising a fruit and a minor proportion of a stabilizer comprising fibrous coconut meat having at least a portion of its oil removed, in intimate mixture, the said stabilizer being capable of absorbing additional moisture.

6. A food product comprising a fruit ingredient baked in dough, the said fruit ingredient comprising a fruit in intimate mixture with a minor proportion of a stabilizer, said stabilizer comprising fibrous coconut meat having at least a portion of its oil removed.

7. The method of making a fruit product which comprises grinding fibrous coconut meat having at least a portion of its oil removed to produce a fruit stabilizer, grinding a fruit, and intimately mixing a minor proportion of the ground stabilizer and the ground fruit.

8. The method of making a fruit product which comprises removing at least a portion of oil from coconut meat and finely grinding the meat to produce a fibrous coconut meat stabilizer, grinding fruit to form a paste and intimately mixing a minor proportion of the ground stabilizer and fruit paste.

9. The method of making a bakery product which comprises, combining with a mass of dough a fruit and a stabilizer with the stabilizer and fruit in intimate mixture, the said stabilizer comprising fibrous coconut meat having at least a portion of its oil removed, and baking the fruit and stabilizer in the dough.

10. A fruit product comprising an intimate mixture of a fruit and a minor proportion of a stabilizer comprising fibrous nut meat having at least a portion of its oil removed.

11. A fruit product comprising an intimate mixture of dried fruit particles and a minor proportion of a stabilizer comprising fibrous nut meat having at least a portion of its oil removed.

12. A fruit product comprising an intimate mixture of a dried fruit and a minor proportion of a stabilizer comprising fibrous nut meat having at least a portion of its oil removed and capable of absorbing additional moisture.

13. A bakery product fruit ingredient comprising a fruit and a minor proportion of a stabilizer comprising fibrous nut meat having at least a portion of its oil removed, in intimate mixture, the said stabilizer being capable of absorbing additional moisture.

14. A food product comprising a fruit ingredient baked in dough, the said fruit ingredient comprising a fruit in intimate mixture with a minor proportion of a stabilizer, said stabilizer comprising fibrous nut meat having at least a portion of its oil removed.

15. The method of making a fruit product which comprises grinding fibrous nut meat having at least a portion of its oil removed to produce a fruit stabilizer, grinding a fruit, and intimately mixing a minor proportion of the ground stabilizer and the ground fruit.

16. The method of making a fruit product which comprises removing at least a portion of oil from nut meat and finely grinding the meat to produce a fibrous nut meat stabilizer, grinding fruit to form a paste and intimately mixing a minor proportion of the ground stabilizer and fruit paste.

17. The method of making a bakery product which comprises, combining with a mass of dough a fruit and a stabilizer with the stabilizer and fruit in intimate mixture, the said stabilizer comprising fibrous nut meat having at least a portion of its oil removed and baking the fruit and stabilizer in the dough.

JESSE CLAYTON FORKNER.
JOHN H. FORKNER.